INVENTOR
THEODORUS HEHENKAMP
BY
AGENT

United States Patent Office 3,379,954
Patented Apr. 23, 1968

3,379,954
DEVICE COMPRISING AN INVERTER AND AN INPUT FILTER FOR THE SAID INVERTER
Theodorus Hehenkamp, Emmasingel, Eindhoven, Netherlands, assignor to North American Philips Company, Inc., New York, N.Y., a corporation of Delaware
Filed Aug. 10, 1965, Ser. No. 478,589
Claims priority, application Netherlands, Aug. 11, 1964, 64—9,205
3 Claims. (Cl. 321—14)

ABSTRACT OF THE DISCLOSURE

A device for turning off an inverter circuit in response to a power line disturbance before the line fuse is triggered is constructed with a resonant circuit connected between the supply and the inverter circuit. The inductance of the resonant circuit is set so as to be at least 4.62 times the input inductance of the inverter circuit.

---

Figure 1:
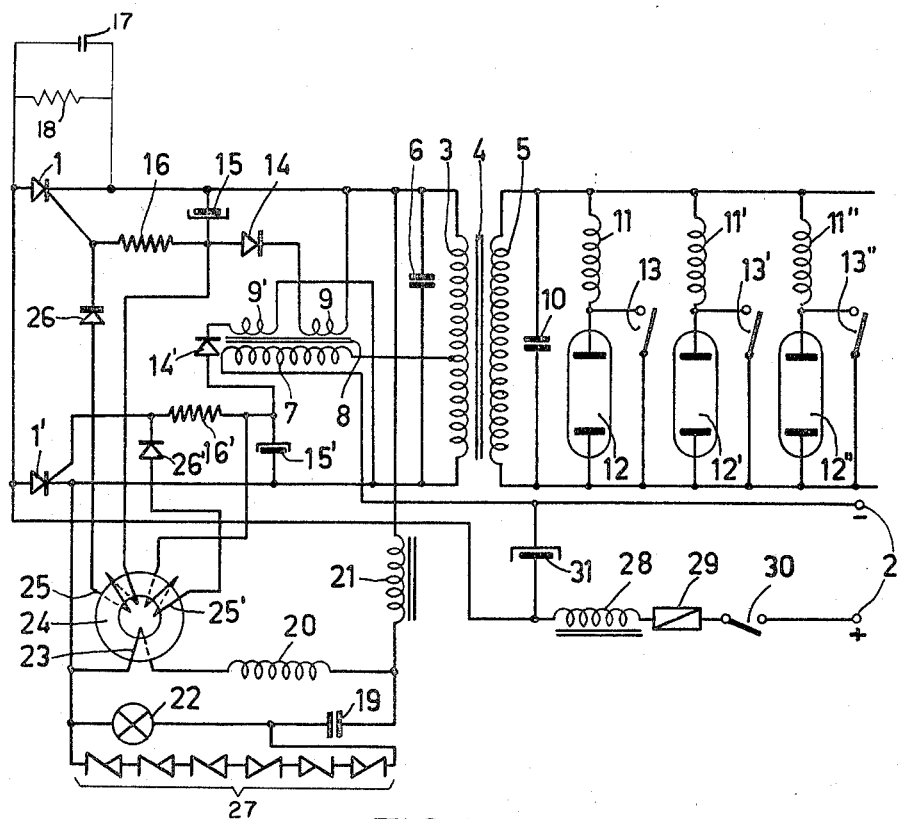

The invention relates to a device comprising an inverter with at least one controlled rectifier, for example, a thyratron or a semiconductor controlled rectifier, for converting the voltage of a direct voltage source into an alternating voltage. Such inverters are known, for example, from the prior application U.S. Serial No. 171,867, filed Feb. 8, 1962. It is normal to shunt their input terminals by a capacitor of, for example, 100μf. so as to keep the produced alternating voltage out of the direct voltage source. In devices comprising more than one inverter connected to a common direct voltage source, it has been found to be advantageous to connect every inverter to the D.C. source through an input filter comprising a series inductance and the above-mentioned cross capacitor so as to similarly isolate the alternating voltage out of the direct voltage source. For this purpose a series inductance of the same value as that of the line to be decoupled, for example, of the order of from 10 to 100μh., is sufficient.

The inverters and in particular their controlled rectifiers are usually protected against such disturbances as overload, short-circuit in the load circuit, not extinguishing in time or untimely ignition of a controlled rectifier, etc. by means of a fuse, preferably a precision fuse. In operation, however, it appears that the greater part of the disturbance is of a temporary nature. In railway lighting devices with inverters, for example, more than 90% of the disturbances is due to bad plug contacts or fitting contacts, temporary short circuits in coupling plugs or fittings or to stray pulses, for example, produced during switching from battery supply to direct current generator supply, or conversely. The result of these disturbances is a great consumption of fuses. The replacement of a melted fuse under many circumstances is an uneasy operation and at any rate requires the intervention of an expert.

The object of the invention is to provide a powered device in which the inverter itself is safeguarded against disturbances of a temporary nature, so that such disturbances cannot cause the blowing of a fuse. It is a further object of the invention to use the input filter which is usually already present as a safety extinguishing circuit as well as a filter.

The device according to the invention consequently comprises an input filter with a series inductance and a cross capacitor connected to the direct voltage source through the said series inductance for keeping the produced alternating voltage out of the direct voltage source and of the line to the said direct voltage source. It is characterized in that the value of the series inductance is chosen to be large. The damped oscillation produced in the series combination of the series inductance and the cross capacitor by a disturbance in the inverter or in its supply or load circuit causes the voltage across the cross capacitor to pass through the value zero so that the controlled rectifier extinguishes again in spite of the disturbance.

Figure 2:
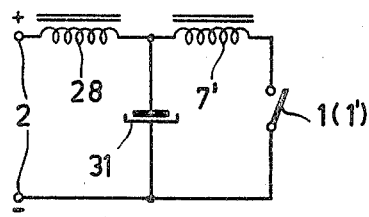

In order that the invention may readily be carried into effect it will now be described in greater detail, by way of example, with reference to the accompanying drawing, in which FIG. 1 is the circuit diagram of an embodiment of the device according to the invention and FIG. 2 is an equivalent-circuit diagram to explain the operation of the device according to the invention.

The embodiment shown in FIG. 1 comprises an inverter of the type described in prior application Ser. No. 396,850, filed Sept. 16, 1964. The said inverter comprises two controlled semiconductor rectifiers 1 and 1'. It has for its object to convert the direct voltage of a source 2 into a higher alternating voltage of higher frequency, for example, of 6800 c./s. for supplying a number of fluorescent tubes 12, 12', 12" and so on via control inductances 11, 11' and 11" respectively. The tubes 12, 12', 12" can be extinguished individually through permanent short circuit switching by means of switches 13, 13' and 13" respectively and the inductivity of the load formed by the tubes and their control inductances is compensated for by a capacitor 10 which is connected across the secondary 5 of an output transformer 4.

The anodes of the rectifiers 1 and 1' are connected to the positive input terminal of the inverter through reactor 28, fuse 29 and switch 30. The cathodes are connected to the negative input terminal each via a corresponding half of the primary 3 of the push-pull output transformer 4 and via a common choke coil 7 having a core 8 of a ferromagnetic material. The said core still comprises two secondaries 9 and 9' for producing a small negative bias voltage for the control electrodes of the rectifiers 1 and 1'. The windings 9 and 9' are connected at one end to the cathode of the corresponding rectifier 1 and 1' respectively and at the other end through a rectifier 14 and 14' to the control circuit 16, 25, 26 and 16', 25', 26' respectively for the said rectifier and to an electrolytic capacitor 15 and 15' respectively connected across the series combination of the winding 9 and 9' respectively and of the rectifier 14 and 14' respectively.

The primary 3 of the output transformer is shunted by a capacitor 6 with which it forms the capacitive part of a first oscillatory circuit, with a series resonance characteristic of which the inductive part consists of the choke coil 7, 8. The said first oscillatory circuit is connected across the input terminals of the inverter alternately via the rectifier 1 and via the rectifier 1'. The rectifiers 1 and 1' are alternately made conductive by a pulse produced under the control of the current through a second oscillatory circuit 19, 20, 21, 22, 23, 24, 27 connected across the capacitive part 3, 6 of the first oscillatory circuit and comprising at least a resistor 22 in the form of a filament lamp for subcritical damping and one non-linear element formed by a winding 23 provided on a core 24 of ferromagnetic material with rectangular hysteresis loop, for example, a ferrite material. The said oscillatory circuit further comprises a first inductance 20 connected in series with the winding 23 across the series combination of the resistor 22 (shunted by a limiter 27 formed by the series combination of six Zener diodes) and of a capacitor 19, and finally a second inductance 21 connected in series with the above-mentioned parallel branches.

During operation the core 24 flips from a saturation condition to the opposite saturation condition shortly after the current passes through zero through the part 20, 23 of the second oscillatory circuit, as a result of which pulses are produced in the secondaries 25 and 25' of the said core. Via a diode 26 and 26' respectively the said pulses are alternately applied in the forward direction across the resistor 16 and 16' respectively and between the control electrode and the cathode of the rectifier 1 and 1' respectively which are ignited as a result. The switching frequency of the inverter is consequently determined mainly by the values of the reactive and resistive elements of the second oscillatory circuit 19-24, 27 while the duration of each conduction period of each of the rectifiers 1 and 1' is at most equal to half an oscillation cycle of the first oscillatory circuit 3, 6, 7, 8.

The figures further show a very simple starting circuit formed by a capacitor 17 shunted by a discharge resistor 18 and connected between the cathode and the anode of the rectifier 1. When the inverter is switched on, the resulting current pulse is passed through the first oscillatory circuit 3, 6, 7, 8 and consequently through the second oscillatory circuit 19-24, 27, so that a first pulse is produced in the windings 9 and 9'.

The inverter shown is connected to its direct voltage source 2 through a series inductance 28, a fuse 29 and an off-on switch 30. An electrolytic capacitor 31, for example, 100μf. is connected across the inverter input terminals. The electrolytic capacitor serves to keep the alternating voltage produced by the inverter out of the direct voltage source 2 and the series inductance 28 improves the filtering action of the said capacitor. The inductance 28 is particularly useful when several inverters have to be supplied by one direct voltage source because it then counteracts a mutual coupling of the said inverters via a common supply line. For this purpose a comparatively small inductance 28 of the order of magnitude of the inductivity of the supply line is already sufficient at the comparatively high frequency, for example 6800 c./s., of the produced alternating voltage. With a supply line having an inductivity of from 10 to 100, it is common to use an inductance 28 of the same order of magnitude, for example, of 100μh.

According to the invention the value of the series inductance 28 has been chosen to be large so that as a result of the damped oscillation produced in the series combination of the series inductance 28 and of the cross capacitor 31 by a disturbance in the inverter or in its supply or load circuit, the voltage across the cross capacitor 31 passes the value zero so that the controlled rectifier 1 or 1' again extinguishes in spite of the disturbance.

The said disturbances of a temporary nature may be of three different types:

(1) The load circuit is interrupted for a short period: A current and/or voltage overload of the controlled rectifier(s) can be avoided by suitable proportioning of the inverter. When the voltage of the supply 2 is abnormally high at the time of an overload the controlled rectifier or one of the controlled rectifiers may not extinguish at the end of the conducting period as determined by the circuit 3-5, 6, 7, 8 thereby causing a blowing of the fuse 29. This can be prevented by using the oscillatory circuit constituted by the input filter 28, 31 together with the inverter which is short-circuited as a result of the fact that a controlled rectifier remains conducting. When this oscillatory circuit is damped subcritically, the current through this rectifier once again passes through zero so that the same extinguishes after approximately three quarters of a comparatively very long period of the said oscillatory circuit. For this purpose the inductivity of the series inductance 28 must be at least 4.62 times as large as the sum of the inductivity of the choke coil 7, 8 and one half that of the primary 3 of the transformer 3-5.

(2) The load circuit is short-circuited for a short time: The controlled rectifier conducting at the instant of the short circuit does not extinguish at the end of its conductivity period, causing the fuse 29 to blow. This can be avoided again by choosing the inductivity of the series inductance 28 to be at least 4.62 times as large as the sum of the inductivity of the choke coil 7, 8 and of the effective inductivity of half of the primary 3 of the transformer 3-5. This latter inductivity is then equal to that of the parallel arrangement of the natural inductivity of one half of the primary 3 and of the corresponding part of the stray inductivity of the transformer 3-5 and, consequently, substantially equal to one fourth of the total stray inductivity of the said transformer.

(3) A rapid decrease of short duration of the voltage of the supply source 2: Any decrease of this voltage results in a decrease of the output voltage of the inverter with an operating frequency which is also decreased. The decreased output voltage involves a shortening of the available recovery period. This means that when the load remains effective, in this case when the tubes 12, 12' and so on do not extinguish, one of the controlled rectifiers can no longer extinguish at the end of its conductivity period. This may occur in the case of rapid decreases of the voltage of the supply source 2 and even cause a blowing of the fuse 29 in the case of a decrease of short duration. This can again be avoided by choosing the series inductance 28 to be at least 4.62 times as large as the sum of the inductivity of the choke coil 7, 8 and of the effective inductivity of half of the primary 3 of the transformer 3-5. In this case the value of the said effective inductivity lies between that of half of the winding 3 with unloaded transformer 3-5 (case 1) and one-fourth of the total stray inductivity of the said transformer (case 2).

It will now be demonstrated with reference to the equivalent circuit diagram shown in FIG. 2 that the above-described extinguishing condition is indeed fulfilled when the value of the series inductance 28 is at least 4.62 times as large as the inductance 7' operative in the main current circuit of every controlled rectifier 1 or 1' which, in the embodiment described and under no load conditions, is substantially equal to the sum of the inductivity of the choke coil 7, 8 and of the natural inductivity of one half of the primary 3 of the transformer 3-5.

The above-described disturbances finally all come to a short-circuit of the direct voltage source 2 via the series arrangement of the series inductance 28, of the input reactance 7' of the inverter (in the most unfavorable case equal to the sum of the inductivity of the choke coil 7, 8 and of that of one-half of the primary 3 of the transformer 3-5 and of a switch constituted by the controlled rectifier or by one of the controlled rectifiers of the inverter. It is clear that the said rectifier will again be capable of extinguishing when at a given instant the current $I_7$ through the input reactance 7' and through the said rectifier again becomes zero.

The variation of the current $i_{28}$ through the series inductance 28, after closing the switch 1 follows from the equation:

$$V_2 = L_{28}\frac{di_{28}}{dt} + \frac{Q_{31}}{C_{31}} \quad (1)$$

wherein $V_2$ is the voltage of the source 2, $L_{28}$ is the inductivity of the series inductance 28, $Q_{31}$ the charge of the capacitor 31 and $C_{31}$ its capacitance.

Further $$i_{28} = i_{7'} + i_{31} \quad (2)$$

wherein $i_{7'}$ is the current through the input reactance 7' and $i_{31}$ is the charge and discharge current respectively of the capacitor 31.

For the right-hand closed circuit 7', 1, 31 of FIG. 2 it holds that:

$$L_{7'} \cdot \frac{di_{7'}}{dt} = \frac{Q_{31}}{C_{31}} \qquad (3)$$

wherein $L_{7'}$ is the inductive input reactance of the inverter.

By differentiation it is obtained that:

$$0 = L_{28} \frac{d^2 i_{28}}{dt^2} + \frac{i_{31}}{C_{31}} \qquad (1')$$

$$\frac{d^2 i_{28}}{dt^2} = \frac{d^2 i_{7'}}{dt^2} + \frac{d^2 i_{31}}{dt^2} \qquad (2')$$

and $$\frac{d^2 i_{7'}}{dt^2} = \frac{i_{31}}{L_{7'} \cdot C_{31}} \qquad (3')$$

From 1' and 2' it follows that:

$$0 = L_{28} \left( \frac{d^2 i_{7'}}{dt^2} + \frac{d^2 i_{31}}{dt^2} \right) + \frac{i_{31}}{C_{31}} \qquad (4)$$

and from 4 and 3':

$$0 = \frac{L_{28}}{L_{7'} \cdot C_{31}} \cdot i_{31} + L_{28} \frac{d^2 i_{31}}{dt^2} + \frac{i_{31}}{C_{31}}$$

or $$\frac{d^2 i_{31}}{dt^2} = - \frac{L_{28} + L_{7'}}{L_{28} \cdot L_{7'} \cdot C_{31}} i_{31} \qquad (5)$$

The solution of the said differential equation is of the form:

$$i_{31} = A \cos \omega t + B \sin \omega t$$

with $$\omega^2 = \frac{L_{28} + L_{7'}}{L_{28} \cdot L_{7'} \cdot C_{31}}$$

With $t=0$, $i_{31}=0$, from which $A=0$. On the other hand $$Q_{31} = \int i_{31} dt = -\frac{B}{\omega} \cos \omega t$$

and again with $$t=0 \text{ is } Q_{31} = C_{31} \cdot V_2 = -\frac{B}{\omega}$$

from which $$B = -\omega \cdot C_{31} \cdot V_2$$

and finally:

$$i_{31} = -\omega C_{31} \cdot V_2 \sin \omega t \qquad (6)$$

From 1' and 6 it is obtained that $$\frac{d^2 i_{28}}{dt^2} = -\frac{i_{31}}{L_{28} \cdot C_{31}} = -\frac{\omega V_2}{L_{28}} \sin \omega t$$

and by integration:

$$\frac{di_{28}}{dt} = \frac{-V_2}{L_{28}} \cos \omega t + K_1$$

and $$i_{28} = \frac{-V_2}{\omega L_{28}} \sin \omega t + K_1 t + K_2 \qquad (7)$$

With $t=0$, $i_{28}=0$ and consequently $K_2=0$. With $$t=0, \frac{di_{28}}{dt} = 0 \text{ also, so that } K_1 = \frac{V_2}{L_{28}}$$

and $$i_{28} = -\frac{V_2}{\omega L_{28}} \sin \omega t + \frac{V_2}{L_{28}} t \qquad (8)$$

Now $$i_{7'} = i_{28} - i_{31} = -\frac{V_2}{\omega L_{28}} \sin \omega t + \frac{V_2}{L_{28}} t + \omega C_{31} \cdot V_2 \sin \omega t$$

and $$i_{7'} = V_2 \left( \omega C_{31} - \frac{1}{\omega L_{28}} \right) \sin \omega t + \frac{V_2}{L_{28}} t$$

Now $i_{7'}$ becomes zero when:

$$\left( \omega C_{31} - \frac{1}{\omega L_{28}} \right) \sin \omega t = -\frac{t}{L_{28}}$$

or, since $$\omega^2 = \frac{L_{28} + L_{7'}}{C_{31} \cdot L_{28} \cdot L_{7'}}$$

$$\frac{L_{28}}{L_{7'}} \sin \omega t = -\omega t \qquad (9)$$

and this is the case when $L_{28}/L_{7'}$ is at least so large that the line which represents the function $$\frac{L_{28}}{L_{7'}} \sin \omega t$$

is just touched by the line which represents the function $-\omega t$ between $\omega t = \pi$ and $\omega t = 3\pi/2$. This point lies at $\omega t = 1.43\pi$, which is 4.5, where $\sin \omega t = 0.975$, so that $L_{28}/L_{7'}$ must be larger than $4.5/0.975 = 4.62$ $$\frac{L_{28}}{L_{7'}} \geq 4.62 \qquad (10)$$

In the embodiment described the inductivity of the choke coil 7 was approximately equal to 20 μh., that of one-half of the primary 3, 160 μh. and a series inductance 28 of approximately 2 mh. was used which consequently amply fulfilled the condition $$\frac{L_{28}}{L_{7'}} \geq 4.62$$

By using the measure according to the invention in practice, the disturbances in operation in railway lighting devices were reduced by a factor exceeding 10.

What is claimed is:

1. In combination, a direct voltage power supply, an extinguishable power utilization device having an internal inductive reactance and a minimum operating voltage level connected to said power supply, a circuit arrangement responsive to a disturbance in the flow of power from said supply to said device for causing the voltage supplied to said device to fall below said minimum operating level, said circuit arrangement comprising an inductance having a value larger than 4.62 times said internal inductive reactance connected in series with said supply and a capacitance connected in parallel with the series combination of said inductance and said supply, said inductance-capacitance combination having a damped oscillatory response to the presence of said disturbance, said response having a voltage characteristic which passes through said minimum operating level, thereby causing said device to extinguish.

2. The combination of claim 1 wherein said utilization device includes an inverter having at least one controlled rectifier, the damped oscillatory response of said circuit being coupled to said rectifier for causing same to extinguish.

3. In combination, a direct voltage power supply, an extinguishable power utilization device having a minimum operating voltage level and including an inverter for converting said direct voltage to an alternatng voltage, said inverter including at least one semiconductor controlled rectifier having an anode cathode path, means coupling said supply to the anode-cathode path of said rectifier, said means including an inductance in series with said supply and a capacitance in parallel with the series combination of said inductance and said supply, said inductance having a value larger than 4.62 times the input inductance of said inverter whereby said inductance capacitance combination produces a damped oscillatory response to a transient disturbance in the flow of power from said supply, said response having a voltage characteristic which passes through said minimum operating level, thereby causing said device to be extinguished by reduction of the voltage across said anode-cathode path below the level necessary to maintain forward conduction in said rectifier.

References Cited

UNITED STATES PATENTS

| 2,730,667 | 1/1956 | Uhlmann | 321—11 X |
| 3,219,905 | 11/1965 | Davis et al. | 321—44 X |
| 3,307,098 | 2/1967 | Elliott | 321—44 |
| 3,319,149 | 5/1967 | Start | 321—14 |
| 3,328,721 | 6/1967 | Hehenkamp et al. | 331—62 |

JOHN F. COUCH, *Primary Exaimner.*

G. GOLDBERG, *Assistant Examiner.*